United States Patent [19]

Imai et al.

[11] Patent Number: 4,511,935

[45] Date of Patent: Apr. 16, 1985

[54] TAPE RECORDER

[75] Inventors: Yougo Imai; Hideo Takenaga, both of Tokyo, Japan

[73] Assignee: Olympus Optical Company Limited, Tokyo, Japan

[21] Appl. No.: 442,572

[22] Filed: Nov. 18, 1982

[30] Foreign Application Priority Data

Nov. 20, 1981 [JP] Japan .................. 56-186385

[51] Int. Cl.³ .................. G11B 5/47
[52] U.S. Cl. .................. 360/66
[58] Field of Search .......... 360/66, 137, 62, 63, 360/61; 331/46

[56] References Cited

U.S. PATENT DOCUMENTS 3,449,529  6/1969  Camras ................. 360/66
4,258,402  3/1981  Sato ................... 360/61

Primary Examiner—Vincent P. Canney
Attorney, Agent, or Firm—Toren, McGeady and Stanger

[57] ABSTRACT

In the disclosed tape recorder, the erase head is supplied with DC erasing current during recording and is connectable with an AC erase unit which supplies AC erasing current instead of the DC erasing current to offer high-quality recording and replay.

6 Claims, 3 Drawing Figures

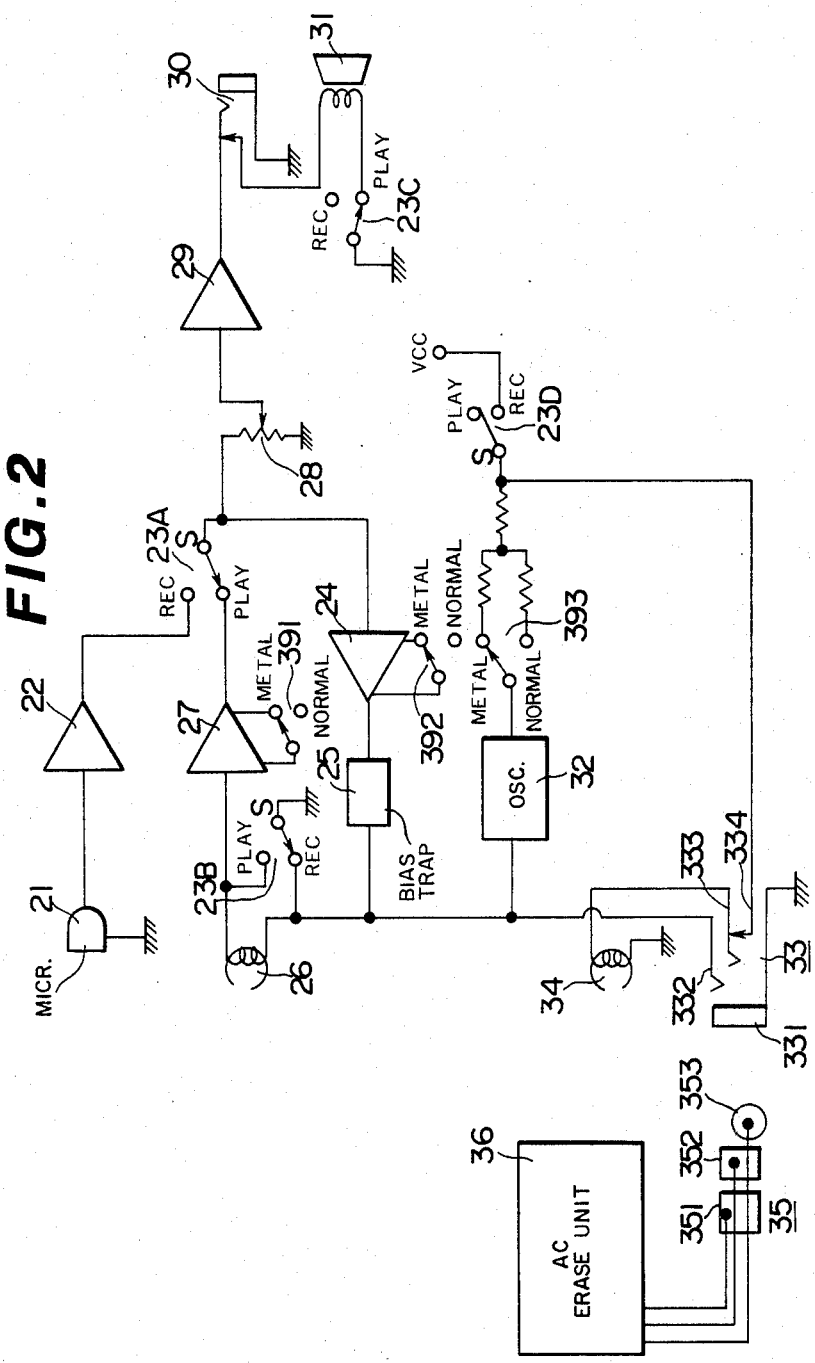

TAPE RECORDER

BACKGROUND OF THE INVENTION

1. Field of the Invention

This invention relates to a tape recorder employing DC erasing system. More particularly, it concerns a tape recorder which is switchable to an AC erase unit.

2. Description of the Prior Art

Two methods are used for erasing signals recorded on a magnetic tape of tape recorder, namely, the DC and AC erasing methods. In the former, DC erasing current is applied to the erase head and, in the latter, AC erasing current is used.

Of these, the DC method is simple and, if the erase head itself consists of a permanent magnet, avoids the need for a power supply for the DC erasing current and results in zero power consumption. Therefore, it is often used in portable tape recorders energized with batteries.

FIG. 1 is a presentation of an example of the tape recorder employing such DC erasing method. Here, a microphone 1 is connected to fixed contact REC of a recording and replay changeover switch 3A through an amplifier 2. This changeover switch 3A is connected a terminal of a recording and replay head 6 through its fixed contact PLAY and through a regeneration amplifier 7. Also, its movable contact S is connected to another terminal of the recording and replay head 6, through a recording amplifier 4 and bias trap 5. In addition, the moving contact S is connected to one terminal of a speaker 11, through a variable resistor 8, power amplifier 9 and earphone jack 10. The other terminal of the speaker 11 is connected to the fixed contact PLAY of a selector or changeover switch 3C. The selector switch 3C is grounded at the moving contact S. In this case, the switch 3C is ganged with the changeover switch 3A.

The top terminal of the recording and replay head 6 is connected to the fixed contact REC of a changeover switch 3B. The other terminal of head 6 is connected to the fixed contact PLAY of said changeover switch 3B. This changeover switch 3B is grounded at its moving contact S. In this case, this changeover switch 3B is ganged with the changeover switch 3A.

The junction between the recording and replay head 6 and the fixed contact PLAY of the changeover switch 3B is connected to a bias oscillator circuit 12. This bias oscillator circuit 12 is further connected to the moving contact S of the changeover or selector switch 3D. This switch 3D in turn connected to the DC power supply Vcc from its fixed contact REC. The selector switch 3D is also ganged with the changeover switch 3A.

The foregoing selector switch 3D is connected to an erase head 13 at its moving contact S. The erase head 13 is supplied with DC erasing current via said selector switch 3D.

Tape changeover switches 141, 142, and 143 are switched between normal tape or metal tape positions depending on kind of tape used.

Now suppose this tape recorder is set to tape replay. Then, the moving contact S of each of switches 3A, 3B, 3C and 3D is switched to the fixed contact PLAY. (FIG. 1 indicates this condition.) Also, the recording and replay head 6 is connected to the speaker 11 by the changeover switch 3A. Further, the switch 3B grounds the junction point of the recording and replay head 6, bias trap 5 and bias oscillator circuit 12. Then, the changeover switch 3C also grounds the other terminal of the speaker 11. In addition, the changeover switch 3D blocks a DC power supply to the bias oscillator circuit 12 and erase head 13. When replay output is generated from the head 6 on this condition, the output is amplified by the regenerating amplifier 7. Thereafter, the output is further amplified in the power amplifier 9, then it is generated in the speaker 11 as replay sound. The replay sound volume is adjustable by the variable resistor 8. Moreover, if an earphone is connected to the earphone jack 10, replay sound can be heard from the earphone instead of the speaker 11.

Next, suppose the tape recorder is set to recording condition. Then, moving contacts S of changeover or selector switches 3A, 3B, 3C and 3D are switched to the fixed contacts REC. Thus, the microphone 1 is connected to the recording and replay head 6 by means of changeover switch 3A. In turn, a junction point between the head 6 and replay amplifier 7 is grounded with the changeover switch 3B. Thus, the speaker 11 is disconnected by the changeover switch 3C. In addition, changeover switch 3D connects the DC power supply Vcc to the bias oscillator circuit 12 and erase head 13. If an input enters the microphone 1, e.g. voice sound, the output of the microphone 1 is amplified by the microphone amplifier 2. Then, it is supplied to the recording amplifier 4 and transmitted to the head 6 as recording signal current. At the same time, AC bias current is applied to the head 6 from the bias oscillator circuit. Under these circumstances, the output of the microphone 1 is continuously recorded on magnetic tape from the head 6. In this case, DC erasing current is supplied to the erase head 13 from the DC power supply to erase signals previously recorded on the tape.

Accordingly, if such kind of tape recorder is used, recording and replay can be done sequentially.

Unfortunately, however, such a DC erasing method conventionally used for these tape recorders utilizes a demagnetizing method which applies a saturated DC magnetic field to the magnetic layer of the tape to demagnetize it to a certain level of residual magnetic field. In consequence, if there is any irregularity in the magnetic layer of the tape or uneven contact of the head to the tape, scattering may be caused in the residual magnetic flux density. This sometimes causes low-quality recording or replay. Worse, in some cases, it produces replay noise, while significantly aggravating defects in replay sound. Another shortcoming of the DC erasing method is that it generated larger signal distortion of the recorded and the replayed sound than the AC erasing method.

Therefore, there has been a general tendency for tape recorders to make only limited use of DC erasing method for a narrow range of purposes, e.g. conversations, etc., because of its many inherent defects.

SUMMARY OF THE INVENTION

An object of the present invention is to eliminate the above described defect to tape recorders.

Another object of the invention is normally to use a DC erasing mehtod and, whenever needed, to connect an AC erase unit to permit high-quality recording and replay, thus presenting tape recorders applicable to a wide range of applications conforming to every purpose of use.

According to the present invention, the tape recorder is provided with recording function and replay function. At the same time, the tape recorder comprises a unit having erase head which is supplied with DC erasing current during recording and an AC erasing unit which is provided to be connectable to the tape recorder unit and, when connected thereto, can supply AC erasing current to said erase head, instead of the above DC erasing current. The tape recorder unit is provided with a bias oscillator circuit which generates AC bias current during recording. The AC erase unit is provided with an auxiliary DC power supply and an amplifier which amplifies AC bias current in the bias oscillator in the tape recorder unit. The AC erase unit is made connectable to the tape recorder unit via plug and jack. The AC erase unit is prepared to supply the tape recorder unit with DC power from the auxiliary DC power supply.

BRIEF DESCRIPTION OF THE DRAWING

FIG. 2 is a block diagram indicating an embodiment of the present invention.

DESCRIPTION OF THE PREFERRED EMBODIMENT

Figure 1:
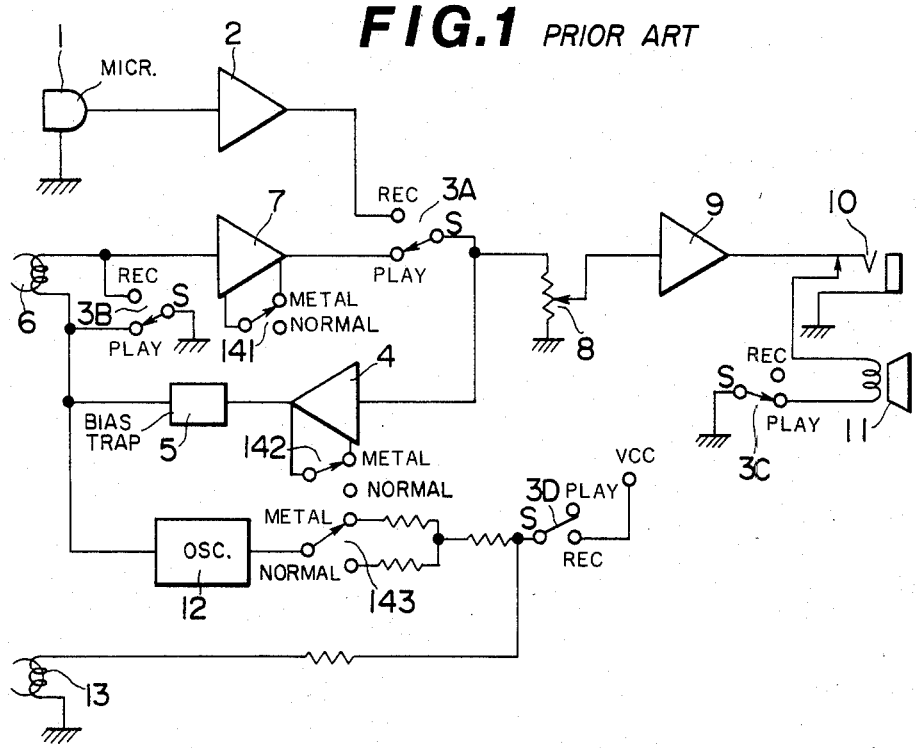
FIG. 1 denotes a block diagram showing an example of conventional tape recorder.

In FIG. 2, 21 is a microphone 21 is connected to the fixed contact REC of a recording and replay changeover switch 23A, via amplifier 22. The fixed contact PLAY of this changeover switch 23A is connected to one terminal of the recording and replay head 26 through regenerating amplifier 27. Also, its moving contact S is connected to the other terminal of the recording and replay head 26 through a recording amplifier 24 and bias trap 25. Also, it is connected to one terminal of a speaker 31 via variable resistor 28, power amplifier 29 and earphone jack 30. The other terminal of this speaker 31 is connected to the fixed contact PLAY of the changeover switch 23C. The moving contact S of this changeover switch 23C is grounded. In this case, the changeover switch 23C is interlocked or ganged with the changeover switch 23A.

Said recording and replay head 26 is connected to the fixed contact REC of the changeover switch 23B on one terminal. Also, the other terminal of it is connected to the fixed contact PLAY of the changeover switch 23B. The moving contact S of this changeover switch 23B is grounded. In this case, the changeover switch 23B is interlocked or ganged with the changeover switch 23A.

A junction point between the recording and replay head 26 and the fixed contact PLAY of the changeover switch 23B is connected to a bias oscillator circuit 32. The bias oscillator circuit 32 is connected to the moving contact S of the changeover switch 23D. The changeover switch 23D is connected to a DC power supply Vcc at its fixed contact REC. In this case, the changeover switch 23D is interlocked or ganged with said changeover switch 23A.

The moving contact S of the changeover switch 23D is connected to an erase head 34 via jack 33.

The jack 33 is provided with jack contacts 331, 332, 333, and 334. Of these, contacts 333 and 334 are made freely separable. These contacts are normally closed and, only when a plug to be described later is plugged in, these contacts become open. Then, the contact 332 of this jack 33 is connected to the above bias oscillator circuit 32. Also, its contacts 333 and 334 are connected to the erase head 341 and the moving contact piece S of said changeover switch 23D, respectively. Further its contact 331 is grounded.

On the other hand, 35 denotes a plug which is pluggable in the jack 33. This plug 35 is provided with plug contacts 351, 352 and 353 corresponding respectively to contacts of the jack 33, i.e. contacts 331, 332, and 333. In addition, an AC erase unit 36 is connected to the plug 35.

Figure 3:
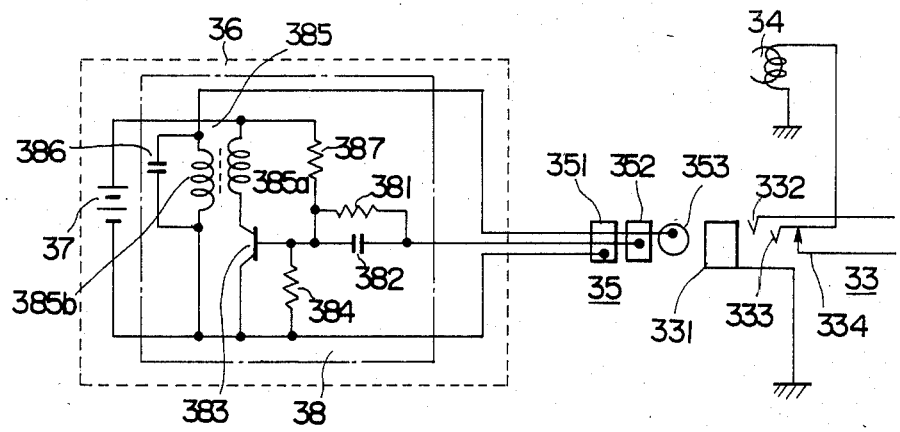
FIG. 3 shows a circuit diagram for AC erase unit used in the same embodiment.

Referring to FIG. 3, the AC erase unit 36 has an auxiliary DC power supply 37 and an amplifier 38.

The amplifier 38 is constituted such that the base of a transistor 383 is connected to the contact 352 of said plug 35 through a parallel circuit comprising a resistance 381 and a condenser 382. The emitter of the transistor 383 is connected to the junction of the plug 35. In addition, it is connected to the base of the transistor 383 via resistance 384. Also, its collector is connected to the primary winding 385a of a transformer 385. The auxiliary DC power supply is connected to a series circuit comprising the primary winding 385a of the transformer 385 and the transistor 383. Also, the secondary winding 385b of said transformer 385, has a capacitor connected parallel thereto. In addition, this parallel circuit is connected in between contacts 351, 353 of the plug 35. The base of said transistor 383 is connected to the junction point between the primary winding 385a of said transformer and the auxiliary DC power supply 37.

In this case, the auxiliary DC power supply comprises battery supply or smoothly rectified voltage source from utility power supply.

Referring to FIG. 2, on the other hand, 391, 392 and 393 denote tape changeover switches by the kind of applicable tape, i.e. normal tape or metal tape.

In operation, when the AC erase unit 36 is not used, contacts 333, 334 of the jack 33 are closed. Therefore, when the tape recorder is set to recording condition on the above configuration, DC erasing current is supplied from DC power supply Vcc to the erase head 34 through the jack 33 to perform a DC erasing operation. However, more detailed description of such recording operation is omitted here because the operation is substantially same as that explained in FIG. 1.

Next, when using the AC erase unit 36, one mounts the plug 35 in the jack 33. This opens contacts 333, 334 of the jack and separates the DC power supply Vcc from the erase head 34. At the same time, contacts 351 and 331, 352 and 332 and 353 and 333 come into respective contact.

When the tape recorder is set to a recording condition with the above connections, fixed contact S in each of changeover switches 23A, 23B, 23C and 23D is switched to the fixed contact REC. Then, a microphone 21 is connected to the recording and replay head 26 by the changeover switch 23A. Also, the switch 23B grounds the junction point between the head 26 and replay amplifier 27. Further, the speaker 31 is separated by the changeover switch 23C. In addition, the switch 23D connects the DC power supply Vcc.

When the microphone 21 catches, for instance, a voice sound in this condition, the output from the microphone 21 is amplified by the microphone amplifier 22 and supplied to the recording amplifier 24 where the signals are applied to the recording and replay head 26 as recording signal current.

On the other hand, the bias oscillator circuit 32 is energized by the DC power supply Vcc to start oscillation and generation of AC bias current. Then, the bias current is supplied to said recording and replay head 26. At the same time, a part of the current is applied to the base of the transistor 383 in the amplifier 38 of the AC erase unit 36, through the contacts 332, 352, of the jack 33 and plug 35. Then, AC signals applied to the base of transistor 383 are amplified and generate AC output via primary winding 385a and secondary winding 385b of the transformer 385. This AC output is supplied to the erase head 34 as AC erasing current, through contacts 353, 333 of the plug 35 and jack 33. In such manner, previously recorded contents on the tape are AC-erased on the erase head 34 on the magnetic tape and, simultaneously, the new output from the microphone 21 is continuously recorded by means of the head 26.

In this case, there is no adverse effect on the recording performance as far as the bias current given to the base of transistor 383 from the bias oscillator circuit 32 is taken sufficiently lower than the bias current applied to the recording and replay head 26.

Also, when the tape recorder is set to replay condition, while the AC erase unit 36 is still connected, moving contact S of each changeover switch 23A, 23B, 23C or 23D is switched to the fixed contact PLAY. This operation 3D disconnects the bias oscillator circuit 32 from the DC power supply Vcc by means of the changeover switch 3D. Accordingly, the erase head 34 will not work any longer and this avoids inconvenience in the tape recorder.

Consequently, as long as this kind of configuration is employed, a tape recorder can be DC-erased during, for instance, portable operation. When using it indoors, etc., an AC erase unit is connected to use AC erasing method, where high-quality recording and replay are enabled. As such, a tape recorder of the present invention can be used for a wide variety of applications. For a reference, there is an improvement of S/N ratio with AC erasing method by as high as 10 dB compared with DC erase. Its efficacy was equivalent or even better than a case employing expensive noise reduction system. In addition, according to the concept of the present invention, a tape recorder is only supplemented with a jack. Also, it is very easy to connect it with an erase unit. Moreover, bias frequency and erasing frequency can be made identical, which effectively helps to prevent beat generation. Therefore, the present invention is most suitable to tape recorders with radio, etc.

The present invention is not limited to the foregoing embodiment but, within its scope and without changing its principal concept, it can be practically applied by modifying the attitude. For example, if the auxiliary power supply 37 on the AC erase unit 36 is connected to the tape recorder unit as a power supply through a plug jack not illustrated the tape recorder becomes long-playable.

What is claimed is:

1. A tape recorder comprising a recording unit having recording bias oscillating means for supplying an AC recording bias current a recording head for receiving the bias current, and erase head, and erase means for supplying said erase head with DC erasing current during recording; and an AC erase unit which is connectable to said unit for supplying AC erasing current to said erase means instead of said DC erasing current so that said erase means supplies AC erasing current to said erase head, said AC erase unit being conductively coupled to said recording bias oscillatory means for receiving the AC bias current and using the AC bias current to produce the AC erasing current.

2. A tape recorder of claim 1, in which said AC erase unit has an auxiliary DC power supply and an amplifier to amplify AC bias current in said bias oscillator circuit of said tape recorder unit and to generate AC erasing current.

3. A tape recorder of either claim 1 or 2, wherein said AC erase unit is connectable to said tape recorder unit via plug and jack.

4. A tape recorder of either claim 1, 2, 3, or 6, wherein said AC erase unit is made to be capable to supply auxiliary DC power supply to said tape recorder unit.

5. A tape recorder as in claim 3, wherein said AC erase unit is coupled to said recording unit exclusively through said plug and jack.

6. A tape recorder comprising a recording unit having recording bias oscillating means for supplying an AC recording bias current a recording head for receiving the bias current, an erase head, and erase means for supplying said erase head with DC erasing current during recording; and an AC erase unit which is connectable to said unit for supplying AC erasing current to said erase means instead of said DC erasing current so that said erase means supplies AC erasing current to said erase head, said AC erase unit being coupled to said recording bias oscillatory means for receiving the AC bias current and using the AC bias current to produce the AC erasing current, a plug and jack, said according unit and said AC erase means being couplable exclusively through said plug and jack.

* * * * *